United States Patent Office 3,845,214
Patented Oct. 29, 1974

3,845,214
FERTILITY CONTROL PROCESS EMPLOYING ETHANOLAMINES
Duane Gordan Gallo and Robert Francis Majewski, Evansville, Ind., assignors to Mead Johnson & Company, Evansville, Ind.
No Drawing. Continuation-in-part of application Ser. No. 73,192, Sept. 17, 1970, which is a continuation-in-part of application Ser. No. 11,873, Feb. 16, 1970, both now abandoned. This application Aug. 14, 1972, Ser. No. 280,303
Int. Cl. A01n 9/22
U.S. Cl. 424—274                                    21 Claims

ABSTRACT OF THE DISCLOSURE

A pharmaceutical process for preventing pregnancy or reducing litter size which comprises post-coital administration of compounds having the formula

to a female mammal is disclosed. The substances useful in this invention are 2-(alkyl-, alkenyl, cycloalkyl-, cycloalkenyl-amino)ethanols, esters and acid addition salts thereof. Estrogenic effects are absent.

CROSS REFERENCE TO RELATED APPLICATIONS

This patent application is a continuation-in-part of pendpending U.S. patent application Ser. No. 73,192 filed Sept. 17, 1970, and now abandoned which is a continuation-inpart of U.S. patent application Ser. No. 11,873 filed Feb. 16, 1970, now abandoned.

FIELD OF THE INVENTION

This invention is in the field of drug bio-affecting, and body treatment and involves administration of 2-(alkyl-, alkenyl-, cycloalkenyl-, cycloalkyl-amino)-ethanols and their carboxylic ester derivatives or an acid addition salt thereof for mammalian fertility control.

DESCRIPTION OF THE PRIOR ART

Oral contraceptive products have now been in widespread use for 10 to 12 years. Products currently in use are effective by creation of a state of pseudopregnancy with concomitant prevention of ovulation. These products involve combinations of estrogenic and progestogenic synthetic steroid hormones which are administered either in combination or sequence. Refer to, for example, "New Drugs Evaluated by AMA Council on Drugs" 1967 Edition, pp. 381–399, American Medical Association, Chicago, Illinois.

During this period, research for non-hormonal substances affecting female mammalian fertility has gone forward and some progress in this area has been made. Compounds having a structural relationship to diethylstilbestrol and hexestrol have been one of the most intensive areas of study in this regard. Refer to Cornelius K. Cain "Annual Reports in Medicinal Chemistry, 1968" pp. 191–196, Academic Press, New York 1969. These substances are diphenyl or triphenyl ethylenes and ethanes. No substance from this area of chemical investigation has come into use as an oral contraceptive agent, however. The Cain reference cited also discussed findings with respect to lowering of fertility in male rats by α-glycerol monochlorohydrin, the only simple compound heretofore of interest in the field.

A number of 2-(alkyl-, alkenyl, cycloalkyl-, cycloalkenyl-amino)ethanols such as 2 - (ethylamino)ethanol, 2-(tert.-butylamino)ethanol and 2 - (cyclopentylamino) ethanol have been described in the literature. For instance, 2 - (isopropylamino)ethanol is a simple amino alcohol which has been known for many years. While a variety of complex esters of it have been the subject of medical and pharmacological investigations as analgesics and antispasmodics, nothing has been reported about the pharmacological, toxicological, or medical use of the amino alcohol itself.

Screening data with respect to the anti-cancer action of 2-(isopropylamino)ethanol has been reported by Leiter and Schneiderman in Cancer Research Vol. 19, p. 116 (1959). The substance was inactive against several mouse tumors.

U.S. Pat. No. 3,167,475 dated Jan. 26, 1965, of S. Gottfried et al., deals with anti-anaphylactic compositions containing amino ethanol derivatives such as 2-(methylamino)ethanol, 2 - (ethylamino)ethanol, 2 - (dimethylamino)ethanol, 2-(diethylamino)ethanol, and various salts thereof. The Gottfried et al., compositions are of particular interest as antihistaminic compositions in which the amino ethanol is combined with an antihistamine drug for the treatment of allergic conditions, a use quite unrelated to the present invention. More recently 2 - (ethylamino) ethanol, 2-(isopropylamino)ethanol and 2 - (tert.-butylamino)ethanol have been disclosed in Belgium Patent 741,353 as having coccidiostatic properties.

SUMMARY OF THE INVENTION

This invention relates to a process for reducing mammalian fecundity by oral or parenteral administration of substances characterized by Formula I and non-toxic pharmaceutically acceptable acid addition salts thereof.

Formula I

The substances of Formula I are either ethanolamines or carboxylic acid ester derivatives thereof. In Formula I, $R^1$ is lower alkyl, lower alkenyl, cycloalkenyl, cycloalkyl, alkyl substituted cycloalkyl, dimethylamino, and pyrrolidinyl; $R^1$—NH can also be incorporated in a nitrogen heterocycle such as pyrrolidine to provide a pyrrolidinyl radical; $R^2$ is hydrogen, an alkanoyl radical or a benzoyl radical.

It is to be understood that the term "lower alkyl" as employed herein includes both straight and branched chain hydrocarbon radicals having from 2 to 5 carbon atoms inclusive. Illustrative of lower alkyl radicals are ethyl, propyl, isopropyl, 1-butyl, 1-methylpropyl (sec.-butyl), 2-methylpropyl, tert.-butyl, n-pentyl, 1-methylbutyl, 2-methylbutyl, and the like.

The term "lower alkenyl" as used herein for the meaning of $R^1$ includes both straight and branched chain alkenyl radicals having from 3 to 5 carbon atoms inclusive and is illustrated by the radicals 2-propenyl (allyl), 2-methyl-2-propenyl, 3-methyl-2-butenyl, 3-butenyl, and the like.

The term "cycloalkenyl" as used herein for one of the meanings of $R^1$ in Formula I, stands for a radical having 3 to 5 carbon atoms inclusive and is illustrated by 2-cyclobutenyl, 2-cyclopentenyl, 3-cyclopentenyl, and the like.

The term "cycloalkyl" as used herein for one of the meanings of $R^1$ includes such radicals as cyclopropyl, cyclobutyl, and cyclopentyl.

The term "alkyl substituted cycloalkyl" as used herein for one of the meanings of $R^1$ means a cycloalkyl radical having 3 to 5 carbon atoms inclusive which has an alkyl substituent selected from the group consisting of methyl, ethyl, n-propyl, and isopropyl.

The term "alkanoyl" as used herein for one of the meanings of $R^2$ is an alkanoyl radical having from 2 to 24 carbon atoms. Exemplary of carboxylic acids corresponding to the alkanoyl radicals are: acetic, butanoic, hexanoic, octanoic, decanoic, dodecanoic, tetradecanoic, hexadecanoic (palmitic), octadecanoic (stearic), eicosanoic, docosanoic, tetracosanoic, 2-methylpropionic, 2-dimethylbutanoic, 3-methylbutanoic, 3-ethylbutanoic, and 3,3-dimethylbutanoic.

Substances characterized by Formula I which are useful in the fertility control process of the present invention are readily prepared according to methods well-known to those skilled in the art. For example, one convenient way of preparing ethanol amines of Formula I, wherein $R^2$ is hydrogen, is by catalytic (e.g. $PtO_2$) reductive alkylation of aminoethanol with an aldehyde or a ketone as described in R. B. Wagner and H. D. Zook, Synthetic Organic Chemistry, Chapter 24. The aldehyde or ketone then becomes the $R^1$ substituent in the ethanol amines of Formula I. Reductive alkylation of aminoethanol with cyclopentanone according to the following equation is representative of this method.

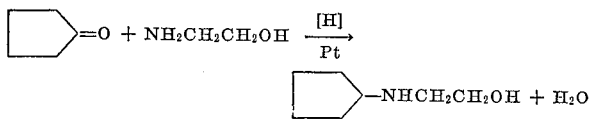

Another way of preparing the substances of Formula I wherein $R^2$ is hydrogen is by the alkylation of an amine represented by $R^1NH_2$ with 2-chloroethanol in the presence of an acid acceptor such as potassium carbonate. Alkylation of cyclopropylamine with 2-chloroethanol according to the following equation illustrates this method.

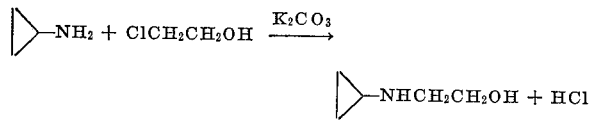

Another convenient method of obtaining ethanol amines of Formula I wherein $R^2$ is hydrogen is by the reaction of an $R^1NH_2$ amine with ethyl oxalyl chloride to provide the ethyl ester of an oxalamide. This material is reduced with lithium aluminum hydride to provide the ethanol amine of Formula I wherein $R^2$ is hydrogen. This method is illustrated in the following reaction scheme which represents the preparation of 2-(n-propylamino)ethanol.

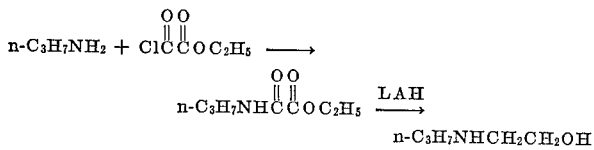

Esters of Formula I wherein $R^2$ is an alkanoyl or benzoyl radical are prepared by standard methods such as reaction of an amino alcohol with an alkanoyl or benzoyl chloride in an inert reaction solvent.

It has been discovered that substances of Formula I are effective fertility control agents in mammals when administered orally or parenterally to the female of the species in doses ranging from about 0.015 to 3 millimole of the active ingredient per kilogram of body weight. The ethanol amines and esters of Formula I are particularly effective in the reduction of pregnancy when administered from the time of mating (coitus) to prior to the time when implantation of the fertilized ovum is complete and placental development commences.

A preferred group of compounds useful in the present fertility control process are those of Formula I wherein the $R^1$ radical is isopropyl, cyclopentyl, cyclobutyl, or 2-cyclopentenyl and $R^2$ is hydrogen or an alkanoyl radical having from 2 to 16 carbon atoms. Compounds which are particularly preferred in practicing the present process are:

2-(isopropylamino)ethanol,
2-(cyclopentylamino)ethanol,
2-(cyclobutylamino)ethanol,
2-(2-cyclopentenyl)ethanol.

Oral or parenteral administration of the substances of Formula I or an acid addition salt thereof to a mammal during the period between fertilization and implantation of the fertilized ovum interferes with the production of offspring. The dose can be adjusted so as to either prevent pregnancy, or to merely reduce litter size. Thus, the substances of Formula I are effective antifertility agents useful in the process of the present invention in control of animal populations for demographic, sociological, medical, or rodent control purposes. For example, 2-(cyclopentylamino)ethanol, 2-(2 - cyclopentenylamino)ethanol and 2 - (isopropylamino)ethanol are effective when administered orally or parenterally to the female of the species in doses in the range of 0.1 to 1 millimole per kilogram of body weight.

The substances of Formula I and their pharmacologically acceptable salts are non-toxic and substantially free of other pharmacologic effects upon oral or parenteral administration to a mammal at doses which produce the antifertility effect on the female of the species. The $LD_{50}$ values for the acute toxicity in the mouse treated orally with 2-(isopropylamino)ethanol or 2-(cyclopentylamino)ethanol is approximately 580 and 4000 mg./kg. body weight, respectively. Oral or intraperitoneal administration of 2-(cyclopentylamino)ethanol as a neutralized aqueous solution to mice at doses up to 250 to 500 mg./kg. produces no pharmacological effect other than the antifertility action which is the subject of this invention. The intraperitoneal $ALD_{50}$ of 2-(cyclopentylamino)ethanol hemimucate in mice is 950 mg./kg. body weight.

In the practice of the present invention, it is preferred to employ a pharmacologically acceptable acid addition salt of the substances of Formula I since the amino alcohols and esters are relatively strong bases and might therefore be irritating to the gastro-intestinal mucosa or other tissues with which they come in contact on oral or parenteral administration. The term "pharmacologically acceptable acid addition salt" is intended to refer to those salts of the substances of Formula I in which the anion does not contribute significantly to the toxicity nor detract from antifertility action of the basic compound. Suitable salts include particularly those of the strong inorganic acids including hydrochloric, hydrobromic, hydroiodic, sulfuric, nitric, and phosphoric acids. It also includes both the strong organic acids such as the aryl and aliphatic sulfonic acids and acid sulfates such as p-toluenesulfonic acid, methanesulfonic acid, lauryl sulfuric acid, etc. and the non-toxic carboxylates including salts of benzoic, acetic, propionic, citric, mucic, lactic, tartaric, maleic, and other acids useful in forming salts for pharmaceutical purposes. The salts may be prepared by a simple neutralization process from the ethanol amine bases or esters of Formula I as is well-known to those skilled in the art.

The dosage figures given herein refer to the dose of "active ingredient," a term which comprehends the ethanol amine bases or esters. When employing an acid addition salt of the amino alcohol bases or esters of Formula I, the size of the dose should be adjusted to take into account the percent of active ingredient contained in the salt. For example, amino alcohols such as 2-(isopropylamino)ethanol or 2-(cyclopentylamino)ethanol are relatively low molecular weight substances; thus, when administered in the form of a salt of an acid with a relatively heavy molecular weight such as mucic acid, a substantial proportion of the salt is inert material on a weight basis.

Substances characterized by Formula I can be employed in admixture with the usual pharmaceutical carriers in carrying out the fertility control process of the present invention. Consideration should be given to those organic and inorganic carrier substances which are suitable for oral and parenteral application and which do not enter into reaction with the ethanol amines and esters of Formula I. Suitable carriers by way of example are water, vegetable oils, polyethylene glycol, gelatin, lactose, starch, magnesium stearate, talc, and so on. For oral application, tablets, capsules, powders, granules, syrups, elixirs, liquid suspensions, or solutions are especially preferred. The substances of Formula I are incorporated with a pharmaceutical carrier in unit dosages providing from 10 to 500 mg. of active ingredient and effective amounts thereof are administered to mammals in practicing the fertility control process of the present invention.

A preferred unit dosage suitable for oral or parenteral administration to female mammals comprises a pharmaceutical carrier and a sufficient amount of an active ingredient selected from the amino ethanols and esters of Formula I whereby an effective dose of between 0.015 to 3 millimoles per kilogram body weight is provided.

Examples 1–7, which follow, illustrate the effectiveness of 2-(isopropylamino)ethanol as an antifertility agent in various animal species. The following are some of the features of the invention which are illustrated by these examples. (1) When given orally at doses of 50 to 100 mg./kg. to the rat, mouse, and rabbit following fertilization, fecundity is substantially reduced and in most instances pregnancy is either reduced or prevented. Refer to Examples 5, 6 and 7. At lower doses litter size is reduced. Refer to Example 4. (2) In the rat a single dose on any of the 6 days following mating is effective in reducing or preventing pregnancy. Administration on the seventh day when implantation of the fertilized ovum is complete is substantially without effect. Refer to Examples 3 and 5. (3) In the rat where litter size is reduced, offspring are, nevertheless, normal in size and appearance. Refer to Examples 4 and 5. A similar effect occurs in the rabbit in the same dosage range. Refer to Example 7.

Attempts have been made to ascertain the mechanism by which the present invention operates, but no definite proposal can be offered at this time. The diphenylethylenes and the triphenylethylenes and ethanes referred to above and other estrogenic compounds are thought to act by accelerating tubal transport of the ovum resulting in its arrival in the uterus prior to the time when the uterus is ready for implantation to occur. This mechanism does not appear to be operant in the present instance, however. Experiments in rats treated with doses of 2-(isopropylamino)ethanol up to 100 mg./kg. of body weight have revealed that the rate of tubal transport is normal.

The drug appears to operate prior to the stage of placental development. This is suggested by the fact that in the rat pregnancy is blocked by administration within the first six days following ovulation and fertilization, but not on the seventh day or later. In the rat, implantation of the blastocyst begins on the fifth day. Thus by day 7, placental development apparently has proceeded to the point where the drug is no longer effective.

The foregoing provides a guide for selecting an appropriate dosage schedule for the substances of Formula I for a specific mammal. The period required for implantation following ovulation has been estimated for many of the mammals of importance. Refer to "Reproductive Physiology of Vertebrates" by van Tienhoven, Saunders, 1968. The following list contains figures which are quoted form that text book. Reference is to the time period for implantation to occur:

| | Days |
|---|---|
| Mouse | 4 |
| Rat | 5 |
| Rabbit | 8 |
| Man | 8–10 |
| Cat | 12–13 |
| Fox | 13 |
| Dog | 13–14 |
| Cow | 20 |

As an illustration of how the foregoing might be applied in a practical situation consider the situation of a prize dairy herd which is accidentally invaded by a bull of an unwanted breed. In order to avoid the expense and nusiance of dealing with a group of unwanted calves, the cows may be treated during the 20-day period following the event with the substances of Formula I or a pharmaceutically acceptable acid addition salt thereof. Similarly, even relatively infrequent ingestion of bait containing Formula I substances or a pharmaceutically acceptable acid addition salt thereof by mice, rats, foxes, or other pests will substantially reduce the fecundity thereof and thus the population over a period of time.

When pregnancy is to be prevented over a prolonged period, dosing is arranged according to a repetitive schedule which will provide for treatment following ovulation on the assumption that fertilization has occured. With some animals this can easily be determined by the time when the animals comes into estrus. With other animals including man where the time of ovulation may not be known or easily determined, dosage is repeated at regular intervals which are no longer than the normal period between ovulation and implantation and placental development for that species. Dosage with 2-(isopropylamino)ethanol or 2-(cyclopentylamino)ethanol or other Formula I substances do not alter the estrus cyc'e. Another way is to simply administer a dose whenever coitus occurs.

One of the advantages of the present invention is that no estrogenic action is exerted by administration of 2-(isopropylamino)ethanol or other amino alcohols and esters of Formula I or suitable salts thereof. A number of the side effects attributable to current oral contraceptives are believed to be a corollary of the estrogenic action thereof. One of the objects of current research in the field has been to find an effective oral contraceptive agent which is free of estrogenic properties. Such has been achieved by the present invention. Lack of estrogenicity is suggested by the experiments referred to above in which it was observed that the compound is without effect on the estrus cycle or on the rate of tubal transport. This was confirmed by testing for uterotropic activity in the immature mouse by the method of Edgren, Proceedings of the Society for Experimental Biology and Medicine, Vol. 92, page 569 (1956). Thus the uterine weights of immature mice treated with up to 300 mg./kg. of 2-(isopropylamino)ethanol hydrochloride or 2-(cyclopentylamino)ethanol hemimucate orally on each of three successive days prior to sacrifice were found to be no greater than the uterine weights of untreated control mice within the limits of statistical significance.

Further confirmation of the lack of estrogenic properties was obtained by evaluation of 2-(isopropylamino)-ethanol or 2-(cyclopentylamino)ethanol in the vaginal cornification test in the rat according to a standard technique ("Methods in Hormone Research, II" Dorfman, Academic Press, 1962, pages 65–80). A negative response was obtained with doses of up to 250 mg./kg. of 2-(isopropylamino)ethanol as the hydrochloride or up to 700 mg./kg. of 2-(cyclopentylamino)ethanol hemimucate. In rats the periodicity of whose estrus cycle had been established by microscopic examination of vaginal smears, it was found that oral doses of 100 mg./kg. of 2-(isopropylamino)ethanol hydrochloride or 700 mg./kg. of 2-cyclopentylamino)ethanol hemimucate did not alter the cycle. In an additional test, a state of pseudopregnancy was induced in rats which were then treated with 100 mg./kg. of 2-(isopropylamino)ethanol hydrochloride or 700 mg./kg. of 2-(cyclopentylamino)ethanol hemimucate. It was observed that the duration of the pseudopregnant state was not altered by this treatment. Substances having hormonal activity such as estrogens or progestogens alter the duration of pseudopregnancy. Fertilized rats treated with 2-(isopropylamino)ethanol that nevertheless, whelped, albeit with litters of reduced size, were observed to have normal periods of gestation, another sign that the compound lacks an estrogenic action.

The oral efficacy of other substances characterized by Formula I in the fertility control process of the present invention is illustrated by Examples 9 to 21. These examples demonstrate that the compounds embraced by Formula I are effective fertility control agents when orally administered to rats at dosages ranging from about 0.1 millimole to 3 millimole of active ingredient per kilogram body weight.

Using the preceding description, it is believed that one skilled in the art can practice the present invention to its fullest extent. The following specific embodiments are, therefore, to be construed as merely illustrative and not limitative in any way whatsoever.

DESCRIPTION OF THE SPECIFIC EMBODIMENTS

Example 1.—Effect of Multiple Subcutaneous Doses on Implantation Rate in the Rat Mature female rats of the Wistar strain weighing between 200 and 300 g. were mated to male animals of the same strain. Day 1 was designated as that day on which sperm was first observed in a vaginal smear after caging the animals together. The animals of one group were untreated except for injection of the oil vehicle. Those of another group were treated by subcutaneous injection with a dose of 25 mg./kg. of 2-(isopropylamino)ethanol as the free base suspended in MCT oil, and those of the third group with 50 mg./kg. administered in the same manner. MCT oil is a medium chain coconut oil fraction comprised of about 95% by weight of triglycerides of octanoic and decanoic acids. The animals were dosed each day for the first six days after mating. On the eighth day the animals were sacrificed and both uterine horns were removed and examined for implantation sites. Results obtained are listed below:

| Daily Dose (mg./kg.) | Percent with implantation sites |
|---|---|
| None | 100 |
| 25 | 70 |
| 50 | 20 |

Example 2.—Effect of Multiple Oral Doses on Implantation Rate in the Rat

The experiment described in Example 1 was repeated except that dosing was by the oral route employing an aqueous solution containing the appropriate amount of 2-(isopropylamino)ethanol. The following results were obtained:

| Daily Dose (mg./kg.) | Percent with implanation sites |
|---|---|
| None | 100 |
| 10 | 100 |
| 20 | 100 |
| 30 | 50 |
| 50 | 0 |

Example 3.—Effect of a Single Oral Dose on Pregnancy Rate in the Rat

Groups of mated female rats were prepared as described in Example 1 and arranged for treatment respectively on days 6 and 7 after coitus with a single oral dose of 2-(isopropylamino)ethanol as the hydrochloride salt. Three groups were used for each treatment day. One group served as control and received water only, the second group received 50 mg./kg. of the compound as the hydrochloride in aqueous solution, and the third group 100 mg./kg. The animals were subsequently sacrificed and the uteri examined for implantation sites. Any animal exhibiting at least one implantation site was considered to be pregnant. The following results were obtained:

| Dose (mg./kg.) | Day treated | Day sacrified | Percent pregnant | Mean number of implants per animal |
|---|---|---|---|---|
| None | 6 | 15 | 90 | 11.1 |
| 50 | 6 | 15 | 20 | 1.0 |
| 100 | 6 | 15 | 10 | 4.0 |
| None | 7 | 15 | 100 | 12.7 |
| 50 | 7 | 15 | 100 | 11.5 |
| 100 | 7 | 15 | 90 | 12.1 |

Example 4.—Effect on Litter Size and Offspring on Oral Treatment of Mated Female Rats Four groups of mated female rats containing 10 animals were arranged for oral treatment. One group served as control and was treated only with water, which was used as vehicle. The animals of the other three groups respectively received 30, 35 and 40 mg./kg. of body weight of 2-(isopropylamino)ethanol on each of the first three days after mating. The animals were allowed to go to term and the size of the litters and the weights of the individual pups were determined. Each pup was examined for abnormalities. All pups were found to be normal in appearance. The numerical results are arranged in the following table:

| | Number whelping* | Mean litter size | Mean pup weight (g.) |
|---|---|---|---|
| Dose (mg./kg.): | | | |
| 0 | 8 | 12.6 | 6.0 |
| 30 | 0 | | |
| 35 | 1 | 1 | 7.1 |
| 40 | 0 | | |

* Of 10 mated animals.

Example 5.—Effect of Single Dose Oral Treatment of Mated Female Rats on Litter Size and Offspring The experiment described in Example 4 was repeated employing eight groups of animals arranged for treatment of three groups on the second day after mating, two groups on the fourth day after mating, and three groups on the fifth day after mating. To one group of animals treated on the second day and one group of animals treated on the fifth day, the vehicle only was administered. They served as control groups. Two oral dosage levels, 50 mg./kg. and 100 mg./kg., were evaluated for each treatment day. The results are given in the following table:

| Dose (mg./kg.) | Treatment day | Number whelping/ number of rats | Mean gestation period (days) | Mean litter size | Mean pup weight (g.) |
|---|---|---|---|---|---|
| 50 | 1 | 7/10 | 23.4 | 4.0 | 6.4 |
| 100 | 1 | 1/10 | 23.0 | 10.0 | 6.2 |
| 0 | 2 | 7/7 | 22.7 | 8.3 | 6.7 |
| 50 | 2 | 7/10 | 23.6 | 3.9 | 6.5 |
| 100 | 2 | 0/10 | | | |
| 50 | 4 | 3/10 | 23.0 | 5.3 | 5.9 |
| 100 | 4 | 0/10 | | | |
| 0 | 5 | 10/10 | 22.3 | 11.7 | 5.9 |
| 50 | 5 | 1/8 | 21.0 | 9.0 | 6.2 |
| 100 | 5 | 0/10 | | | |

Example 6.—Effect of Oral Administration on Pregnancy in the Mouse

This experiment was conducted with mated female mice in a fashion similar to that used with rats described in Example 3. Oral dosage with 2-(isopropylamino)ethanol as the hydrochloride was repeated daily on the first 3 days after mating. Again all animals were sacrificed on the eighth day and the uteri examined. The daily doses and results are listed below:

| | Number pregnant/ number treated | Mean number of implants per pregnant animal |
|---|---|---|
| Daily dose (mg./kg.): | | |
| 0 | 7/9 | 11.4 |
| 50 | 5/9 | 8.9 |
| 100 | 1/10 | 5.0 |

Example 7.—Effect of Oral Administration on Pregnancy in the Rabbit

This experiment was executed in the same way as that described in Example 6 except that fertilized rabbits were employed. Drug dosage was on days 1, 2, and 3, as before, and the animals were sacrificed and the uteri examined on day 8. The following results were obtained:

| Daily dose (mg./kg.): | Number pregnant number treated | Mean number of implants per pregnant animal |
|---|---|---|
| 0 | 4.4 | 5.5 |
| 25 | 7/9 | 2.6 |
| 40 | 3/10 | 2.0 |
| 70 | 0/10 | |

In this experiment fertilized rabbits were obtained by inducing ovulation with an intravenous injection of 100 i.u. of human chorionic gonadotrophin followed immediately by artificial insemination. The following day was designated day 1 of pregnancy.

Example 8.—Capsule for Oral Administration (a) 2-(Isopropylamino)ethanol Hemi-mucate.—A solution of 103 g. (1 mole) of 2-(isopropylamino)ethanol in 200 ml. of ethanol is warmed on a steam bath and treated with 105 g. (0.5 mole) of mucic acid. The solution is filtered while warm and allowed to cool. The hemi-mucate salt of 2-(isopropylamino)ethanol crystallizes on cooling. It is collected on a filter, washed with fresh solvent, and dried; m.p. 159–160° C. dec.

(b) Encapsulation.—Hard gelatin capsules, size 000, are filled each with 606 mg. of the salt prepared as described in the preceding paragraph. This quantity is equivalent to 300 mg. of 2-(isopropylamino)ethanol free base and is suitable as an oral dosage for a 60 kg. female mammal in multiple quantities.

Examples 9–21.—Effect of Multiple Oral Doses on Pregnancy Rate in the Rat

Mature female rats of the Wistar strain weighing between 200 and 300 g. are mated to male animals of the same strain. Day 1 of pregnancy is designated as that day on which sperm is first observed in a vaginal smear after caging the animals together. Groups of 10 mated female animals are employed with one group serving as a control. The test compounds are administered orally employing an aqueous solution of the test agent with the control group receiving the dosage vehicle. The animals in each group are dosed each day for the first six days after mating. They are then sacrificed on either day eight or day eighteen and autopsied. Both uterine horns are removed and examined for implantation sites. In the vehicle treated control groups, the number of implantation sites ranges from about 10 to 13 implantation sites per rat. Thus, a decrease in the number of implantation sites indicates that the compound tested is an antifertility agent.

The following Table I indicates results obtained with representative substances of Formula I. At day eight, the mean number of implants per rat is given. This number includes both normal and abnormal implantation sites since the difference between the two cannot be ascertained at this point. At days between 16 and 18, the difference between normal and abnormal implantation sites can be distinguished. The number of viable fetuses present correspond to normal implantation sites whereas no fetuses (alive or dead) are formed at the abnormal implantation sites.

TABLE I.—ANTIFERTILITY ACTIVITY OF REPRESENTATIVE ETHANOLAMINES AND ESTERS THEREOF $R^1-NHCH_2CH_2-O-R^2$

| Example No. | $R^1$ | $R^2$ | Dose, mm./kg.* | Day autopsied | Mean number of implants Total | Viable |
|---|---|---|---|---|---|---|
| 9 | $C_2H_5$ | H | 2.0 | 16–18 | 5.3 | 1.2 |
| 10 | $CH_3CH_2CH_2$ | H | 1.7 | 16–18 | 5.1 | 1.3 |
| 11 | $CH_3CH(CH_3)$ | H | 0.1 | 16–18 | 13.2 | 0 |
|  |  |  | 0.5 | 8 | 0 | 0 |
| 12 | $CH_3CH_2CH(CH_3)$ | H | 0.85 | 8 | 3.7 | |
| 13 | $(CH_3)_3C$ | H | 0.85 | 8 | 0.3 | |
| 14 |  | H | 3.0 | 16–18 | 3.1 | 0 |
| 15 |  | H | 0.5 | 16–18 | 0 | 0 |
| 16 |  | H | 0.2 | 16–18 | 4.5 | 2.7 |
|  |  |  | 0.5 | 8 | 0 | 0 |
| 17 |  | H | 0.1 | 16–18 | 1.5 | 0.6 |
|  |  |  | 0.5 | 16–18 | 0 | 0 |
| 18 |  $CH_3$ | H | 1.0 | 8 | 3.6 | |
| 19 |  $CH_3$ | H | 2.0 | 16–18 | 0 | 0 |
| 20 | $CH_3CH(CH_3)$ | $\overset{O}{\underset{\parallel}{C}}CH_3$ | 0.5 | 8 | 0 | 0 |
| 21 | Same as above | $\overset{O}{\underset{\parallel}{C}}(CH_2)_{14}CH_3$ | 0.5 | 8 | 0 | 0 |

*Mm./kg.=millimole per kilogram body weight.

Example 22

1 - Pyrrolidineethanol prepared according to A. Lespagnol and J. Deprey, Bull. Soc. Chim. Fr., *606* (1961) (b.p. 67–68° C. at 5 mm. Hg, $N_D^{26}$=1.4706 at a dose of 0.5 millimole/kg. body weight for 1 to 6 days atopsied at days 16–18 resulted in a mean of 11 total number of implants and a mean of 0.4 viable number of implants.

Other substances characterized by Formula I which are useful in the fertility control process of the present invention as can be demonstrated according to the hereinabove described test include:

2-(allylamino)ethanol,
2-(2-methyl-2-propenylamino)ethanol,
2-(3-methyl-2-butenylamino)ethanol,
2-(3-pentenylamino)ethanol,
2-(2-butenylamino)ethanol,
2-(3-cyclopentenylamino)ethanol,
2-(2'-n-propylcyclopentylamino)ethanol,
2-(2'-isopropylcyclopentylamino)ethanol,
2-(2'-methylcyclobutylamino)ethanol,
2-(2'-ethylcyclopropylamino)ethanol,
2-(2-cyclopentenylamino)ethyl acetate,
2-(3-cyclopentenylamino)ethyl acetate,
2-(cyclobutylamino)ethyl acetate,
2-(cyclopentlyamino)ethyl palmitate,
2-(cyclopentenylamino)ethyl palmitate,
2-(isopropylamino)ethyl stearate,
2-(cyclopentylamino)ethyl tetracosanate,
2-(3-cyclopentenylamino)palmitate,
2-(cyclobutylamino)ethyl 2-methylpropionate,
2-(cyclobutylamino)ethyl 2,2-dimethylbutanoate,
2-(cyclopentylamino)ethyl 3-methylbutanoate,
2-(2-cyclopentenylamino)ethyl 3-ethylbutanoate,
2-(3-cyclopentenylamino)ethyl 3,3-dimethylbutanoate,
2-(cyclopentylamino)ethyl benzoate,
2-(2-cyclopentenylamino)ethyl benzoate.

The following Table II lists substances of Formula I wherein the lowest approximate dose in millimoles per kilogram of body weight per day administered for 1 to 6 days required to completely prevent pregnancy (no viable fetuses at day 18) in the rate is given.

TABLE II.—LOWEST DOSE REQUIRED TO COMPLETELY PREVENT PREGNANCY IN THE RAT

| Example No. | Compound | Millimole/ kilogram/ day |
|---|---|---|
| 23 | 2-(3-cyclopentenylamino)ethanol | 0.08 |
| 24 | 2-(isopropylamino)ethanol | 0.10 |
| 25 | 2-(2-cyclopentenylamino)ethanol | 0.15 |
| 26 | 2-(cyclobutylamino)ethanol | 0.30 |
| 27 | 2-(cyclopentylamino)ethanol | 0.30 |
| 28 | 2-(t-butylamino)ethanol | 0.50 |
| 29 | 1-pyrrolidineethanol | 0.60 |
| 30 | 1-[(2-hydroxyethyl)amino]pyrrolidine | 0.60 |
| 31 | 2-(2-butylamino)ethanol | 1.0 |
| 32 | 2-(2,2-dimethylhydrazino)ethanol | 1.0 |
| 33 | 2-(1-methylallylamino)ethanol | ~1.25 |

CHEMICAL SYNTHESIS

A number of the substances of Formula I which are useful in the process of the present invention have been previously described in the chemical literature and are known to those skilled in the art. However, in order that these substances should be readily available to those persons desiring to practice the process of the present invention for reducing mammalian fecundity, representative procedures are given below for the preparation of substances characterized by Formula I. By adaptation of these procedures, the ethanol amines and esters thereof which are listed herein can be readily obtained as will be apparent to those skilled in the art.

Procedure 1.—2-(Cyclobutylamino)ethanol

A solution of 2-aminoethanol (8.7 g., 0.14 mole) and cyclobutanone (9.99 g., 0.14 mole) in 30 ml. of absolute ethanol, is reduced on a Paar hydrogenation apparatus employing 0.25 g. of platinum oxide catalyst. After the reduction is complete, the reaction mixture is filtered, the ethanol solvent evaporated and the residue distilled providing 2-(cyclobutylamino)ethanol, b.p. 88.5–90° C. at 9 mm. Hg.

*Analysis.*—Calcd. for $C_6H_{13}NO$: C, 62.57; H, 11.38; N, 12.16. Found: C, 62.89; H, 11.24; N, 12.12.

Procedure 2.—2-(Cyclopropylamino)ethanol hemimucate

2-Chloroethanol (12.5 g., 0.156 mole) is slowly added to cyclopropylamine (8.9 g., 0.156 mole) at 0° C. After completing the addition, the mixture heated to 60° C. for 15 min. Potassium carbonate (21.5 g., 0.156 mole) is then added and the mixture heated for an additional 3 hr. at 50–60° C. The mixture is diluted with ether and filtered. Evaporation of the ether solvent and distillation of the residue provides 2.4 g., of 2-(cyclopropylamino)ethanol, b.p. 72–73° C. at 9 mm. Hg. The amine base is stirred with 2.5 g. of mucic acid in water to provide the hemimucate salt which is purified by crystallization from ethanol-water. The analytically pure 2-(cyclopropylamino)ethanol hemimucate has a melting point of 164.5° C. (dec.) (corr.).

*Analysis.*—Calcd. for $C_5H_{11}NO \cdot 1/2\ C_6H_{10}O_8$: C, 46.59; H, 7.82; N, 6.79. Found: C, 46.29; H, 7.81; N, 6.69.

Procedure 3.—2-(n-Propylamino)ethanol hemimucate

An ethereal solution (100 ml.) of ethyl oxalyl chloride (11.5 g., 0.0845 mole) is added dropwise to n-propylamine (5 g., 0.0845 mole) and triethylamine (12.8 g., 0.127 mole) in 400 ml. of ether at 5° C. After stirring for 16 hr., the reaction mixture is filtered and the ether solvent evaporated. The residue is taken up in ether, filtered and concentrated to provide a solid residue comprised of ethyl-*n*-propyloxalamide which is soluble in methylene chloride.

Ethyl-*n*-propyloxalamide (12.4 g., 0.078 mole) in 150 ml. of tetrahydrofuran is added dropwise to 5 g. of lithium aluminum hydride in 150 ml. of tetrahydrofuran at a rate sufficient to maintain reflux. Reflux is continued for 16 hr. after the addition is complete and the mixture then hydrolyzed by the sequential addition of 200 ml. of ether, 7.9 ml. of 10% sodium hydroxide and finally 10 ml. of water with stirring for 3 hr. The mixture is filtered and the filtrate concentrated *in vacuo* to provide 8.0 g. of 2-(*n*-propylamino)ethanol. This material is distilled to provide 4.4 g. of oil having a boiling point of 71–73° C. at 7 mm. Hg. The hemimucic acid salt is prepared according to Procedure 2 and has a melting point of 157.5–158° C. (dec.) (corr.).

*Analysis.*—Calcd. for $C_5H_{13}NO \cdot 1/2 C_6H_{10}O_8$: C, 46.15; H, 8.71; N, 6.72. Found: C, 46.07; H, 8.83; N, 6.70.

Procedure 4.—2-(2'-Methylcyclopentylamino)ethanol

A solution of 2-methylcyclopentanone (15 g., 0.15 mole) and ethanol amine (8 g., 0.13 mole) in 300 ml. of absolute ethanol is reduced according to Procedure 1 employing 0.25 g. of platinum oxide catalyst. The analytically pure 2-(2'-methylcyclopentylamino)ethanol is obtained on distillation, yield 15 g., (70%), b.p. 102–103° C. at 9 mm. Hg.

*Analysis.*—Calcd. for $C_8H_{17}NO$: C, 67.09; H, 11.96; N, 9.78. Found: C, 67.12; H, 11.88; N, 9.86.

Procedure 5.—2-(2-Propylamino)ethyl acetate hydrochloride

Acetyl chloride (7.85 g., 0.1 mole) is added dropwise to a stirred solution of 2-(2-propylamino)ethanol (10.3 g., 0.11 mole) in 25 ml. of acetic acid. After stirring for 1 hr. the reaction mixture is concentrated *in vacuo* providing a residual oil which is dissolved in chloroform-hexane. Cooling the chloroform-hexane solution yields 7.05 g. of a solid material. Crystallization of this material from butanone provides analytically pure 2-(2-propylamino)ethyl acetate hydrochloride having a melting point of 124–125° C. (corr.).

Analysis.—Calcd. for $C_7H_{15}NO_2 \cdot HCl$: C, 46.28; H, 8.88; N, 7.71; Cl, 19.51. Found: C, 46.25; H, 8.91; N, 7.77; Cl, 19.64.

Procedure 6.—2-(2-Propylamino)ethyl palmitate hydrochloride

Palmitoyl chloride (65.7 g., 0.243 mole) is added to a solution of 2-(2-propylamino)ethanol (24.65 g., 0.263 mole) in 150 ml. of chloroform. The mixture is stirred for 16 hr. and then concentrated in vacuo. Crystallization of the resulting residue first from benzene then from isopropyl alcohol provides 14.1 g. of analytically pure 2-(2-propylamino)ethyl palmitate hydrochloride, m.p. 107–108° C. (corr.).

Analysis.—Calcd. for $C_{21}H_{43}NO_2 \cdot HCl$: C, 66.72; H, 11.73; N, 3.70; Cl, 9.38. Found: C, 66.96; H, 11.84; N, 3.71; Cl, 9.31.

Procedure 7.—2-(2,2-Dimethylhydrazino)ethanol

Glycolaldehyde (9.89 g.) and p-toluenesulfonic acid are added to 50 ml. of dimethylhydrazine in 150 ml. of absolute ethanol at 0° C. The mixture is stirred with 4A-Linde molecular sieve at room temperature for 28 hrs. under an atmosphere of nitrogen, filtered and concentrated under reduced pressure. Distillation of the residual oil yields 14.3 g., of 2-(2,2-dimethylhydrazono)ethanol, b.p. 72–73° C. at 9 mm. Hg.

The 2-(2,2-dimethylaminohydrazono)ethanol hydrazone intermediate is added to sodium cyanoborohydride (8.82 g., 0.14 mole) in 500 ml. of absolute ethanol cooled in an ice bath followed by concentrated hydrochloride acid (11.7 ml., 0.14 mole). After stirring at room temperature for 16 hrs., 33% potassium carbonate is added and the mixture extracted with a mixture of methylene chloride-ether. The methylene chloride-ethereal extract is first dried over sodium sulfate, concentrated and the residue then taken up in methylene chloride and sodium sulfate added thereto. After stirring, the solution is decanted and the residual material re-extracted with methylene chloride. The combined methylene chloride extracts are dried over calcium sulfate, concentrated and distilled to provide 2-(2,2-dimethylhydrazino)ethanol, b.p. 61° C. at 9 mm. Hg.

Analysis.—Calcd. for $C_4H_{12}N_2O$ (percent): C, 46.13; H, 11.61; N, 26.90. Found (percent): C, 46.70; H, 11.91; N, 24.96.

NMR δ (p.p.m.) ($CDCl_3$, tetramethylsilane ref.), 2.42 [s, 6H, N($C\underline{H}_3$)$_2$], 2.82 [t (J=5.5 Hz), 2H, N$\underline{H}_2$], 3.63 [t (J=5.5 Hz), 2H, OC$\underline{H}_2$], 3.37 (broad s, 2H, O$\underline{H}$, N$\underline{H}$).

Procedure 8.—1-[(2-Hydroxyethyl)amino]pyrrolidine

An ethereal solution (200 ml.) of ethyl oxalyl chloride (16.49 g., 0.12 mole) is added dropwise to 1-aminopyrrole (8.23 g., 0.96 mole) and 20 ml. of triethylamine in 100 ml. of ether at ice bath temperature. Stirring is continued with cooling at 0° C. for 4 hrs. and then for a period of 14 hr. at room temperature. The reaction mixture is filtered, the ether solvent evaporated and the residue distilled to provide a fraction having a boiling point of 117–125° C. at 0.08 mm. Hg. The distilled material is taken up in chloroform and washed with a two-fold volume of 33% potassium carbonate. After drying the chloroform fraction over sodium sulfate, the solution is concentrated and distilled to yield 11.7 g. of the hydrazide ethyl-N-pyrrolidinyloxalamide, b.p. 105–110° C. at 0.08 mm. Hg.

Reduction of the hydrazide carried out with lithium aluminum hydride according to Procedure 3 provides 3.8 g., of the 1-[(2-hydroxyethyl)amino]pyrrolidine, b.p. 83–91° C. at 3 mm. Hg.

Analysis.—Calcd. for $C_6H_{14}N_2O$ (percent): C, 55.36; H, 10.84; N, 21.52. Found (percent): C, 54.69; H, 10.81; N, 20.72.

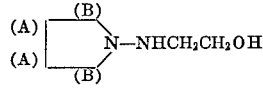

NMR δ (p.p.m.) ($CDCl_3$ tetramethylsilane ref.) 1.75 [m, 4H, ($C\underline{H}_2$)$_2$—A], 2.75 [m, 4H, N($C\underline{H}_2$)$_2$—B], 2.96 [t (J=5.5 Hz), 2H, OC$\underline{H}_2$], 3.77 [t (J=5.5 Hz), 2H, OC$\underline{H}_2$], 3.53 (broad s, 2H, O$\underline{H}$, N$\underline{H}$).

Procedure 9.—2-(1-Methylallylamino)ethanol

Ethyl-N-(1-methylallyl)oxalamide prepared according to Procedure 3 by the reaction of ethyl oxalyl chloride with 1-methylallylamine is reduced with aluminum hydride. The product purified by distillation has a boiling point of 75–75° C. at 5 mm. Hg.

Analysis.—Calcd. for $C_6H_{13}NO$ (percent): C, 62.57; H, 11.38; N, 12.16. Found (percent): C, 62.00; H, 11.57; N, 11.89.

NMR δ (p.p.m.) ($CDCl_3$ tetramethylsilane ref.) 1.16 [d (J=6.4 Hz), 3H, C$\underline{H}_3$], 2.63 (broad s, 2H, O$\underline{H}$ N$\underline{H}$), 2.69 [t (J=5.5 Hz), 2H, NC$\underline{H}_2$], 3.64 [t (J=5.5 Hz), 2H, OC$\underline{H}_2$], 3.18 [q (6.4 Hz), 1H, NC$\underline{H}$], 5.78 [ddd (J=6.4, 10.0, 16.0 Hz) 1H, —C$\underline{H}$=], 5.07 (m, 2H, =C$\underline{H}_2$).

While we have illustrated our invention with the aid of certain specific embodiments, it will be readily apparent to those skilled in the art that our invention is not limited to those embodiments and that various other changes and modifications can be made without departing from the spirit of the invention or the scope of the appended claims.

What is claimed is:

1. The process for reducing mammalian fecundity which comprises administering to a fertilized female mammal by the oral or parenteral routes during the period following ovulation and prior to the time when implantation occurs an effective implantation preventing dose of a compound selected from the group consisting of a compound having the formula $$R^1—NHCH_2CH_2—O—R^2$$

wherein
R$^1$ is selected from the group consisting of lower alkyl having 2 to 5 carbon atoms inclusive, lower alkenyl having 3 to 5 carbon atoms inclusive, cycloalkenyl having 4 to 5 carbon atoms, cycloalkyl having 3 to 5 carbon atoms inclusive, dimethylamino, pyrrolidinyl, and an alkyl substituted cycloalkyl wherein said alkyl substituent has from 1 to 3 carbon atoms inclusive and said cycloalkyl has 3 to 5 carbon atoms inclusive;
R$^2$ is selected from the group consisting of hydrogen, benzoyl and an alkanoyl from 2 to 24 carbon atoms inclusive; or
R$^1$—NH is pyrrolidinyl and a pharmaceutically acceptable acid addition salt of said compound.

2. The process of Claim 1 wherein said effective dose contains from 0.015 to 3 millimole of said compound per kilogram of body weight of said mammal.

3. The process of Claim 1 wherein 2-(isopropylamino) ethanol is employed.

4. The process of Claim 1 wherein 2-(cyclopentylamino)ethanol is employed.

5. The process of Claim 1 wherein 2-(cyclobutylamino) ethanol is employed.

6. The process of Claim 1 wherein 2-(2-cyclopentenylamino)ethanol is employed.

7. The process of Claim 1 wherein 2-(3-cyclopentenylamino)ethanol is employed.

8. The process of Claim 1 wherein 2-(t-butylamino) ethanol is employed.

9. The process of Claim 1 wherein 1-pyrrolidine-ethanol is employed.

10. The process of Claim 1 wherein 1-[2-hydroxyethyl)-amino]pyrrolidine is employed.

11. The process of Claim 1 where said salt is employed in an amount sufficient to provide an effective dose containing from 0.015 to 3 millimole of said compound per kilogram of body weight of said mammal.

12. The process of Claim 1 wherein said salt is employed.

13. The process of Claim 12 wherein a pharmaceutically acceptable acid addition salt of 2-(isopropylamino)ethanol is employed.

14. The process of Claim 12 wherein said pharmaceutically acceptable acid addition salt is 2-(isopropylamino)ethanol hemimucate.

15. The process of Claim 12 wherein a pharmaceutically acceptable acid addition salt of 2-(cyclopentylamino)ethanol is employed.

16. The process of Claim 12 wherein said pharmaceutically acceptable acid addition salt is 2-(cyclopentylamino)ethanol hemimucate.

17. The process of Claim 12 wherein a pharmaceutically acceptable acid addition salt of 2-(cyclobutylamino)ethanol is employed.

18. The process of Claim 12 wherein said pharmaceutically acceptable acid addition salt is 2-(cyclobutylamino)ethanol hemimucate.

19. The process of Claim 12 wherein a pharmaceutically acceptable acid addition salt of 2-(2-cyclopentenylamino)ethanol is employed.

20. The process of Claim 12 wherein said pharmaceutically acceptable acid addition salt is 2-(2-cyclopentenylamino)ethanol hemimucate.

21. The process of Claim 1 wherein treatment takes place following coitus and prior to the time when implantation of a fertilized ovum is complete.

References Cited

UNITED STATES PATENTS 3,167,475    1/1965    Gottfried et al. ____ 424—325 X

OTHER REFERENCES

Cancer Research, April 1959, Vol. 19, No. 3, Part 2, pp. 32–35, 40–41 and 116.

ALBERT T. MEYERS, Primary Examiner

D. R. ORE, Assistant Examiner

U.S. Cl. X.R.

424—309, 311, 312, 325